United States Patent [19]

Showalter et al.

[11] Patent Number: 5,785,100

[45] Date of Patent: Jul. 28, 1998

[54] LIQUID LEVEL DETECTION SYSTEM

[75] Inventors: Steve Showalter, Milmont Park, Pa.; George Birch, Turnerville, N.J.

[73] Assignee: Vickers, Incorporated, Maumee, Ohio

[21] Appl. No.: 801,712

[22] Filed: Feb. 14, 1997

[51] Int. Cl.$^6$ ............................................ B65B 1/04
[52] U.S. Cl. ..................... 141/198; 141/59; 141/392; 137/400
[58] Field of Search ........................ 141/95, 96, 198, 141/206, 217–219, 227, 228, 59, 392; 340/507, 508, 618, 619; 137/400; 250/577, 900–908; 73/293

[56] References Cited

U.S. PATENT DOCUMENTS

| | | | |
|---|---|---|---|
| H1364 | 10/1994 | Toeppen | 250/577 |
| 3,141,094 | 7/1964 | Strickler | 73/293 |
| 3,447,876 | 6/1969 | Barringer | 250/577 |
| 3,553,666 | 1/1971 | Melone | 340/619 |
| 3,662,924 | 5/1972 | Crandall et al. | |
| 3,766,395 | 10/1973 | Keir | |
| 3,808,887 | 5/1974 | Buttriss | |
| 3,844,171 | 10/1974 | Rodger | |
| 3,864,577 | 2/1975 | Pellett et al. | |
| 3,995,168 | 11/1976 | Neuscheler et al. | |
| 4,038,650 | 7/1977 | Evans et al. | |
| 4,069,838 | 1/1978 | Hansel et al. | |
| 4,155,013 | 5/1979 | Spiteri | |
| 4,156,149 | 5/1979 | Vaccari | |
| 4,179,623 | 12/1979 | Jacobsen | 73/293 |
| 4,286,464 | 9/1981 | Tauber et al. | |
| 4,441,533 | 4/1984 | Snyder et al. | |
| 4,485,856 | 12/1984 | Dulian et al. | |
| 4,598,742 | 7/1986 | Taylor | |
| 4,606,226 | 8/1986 | Krohn | |
| 4,670,660 | 6/1987 | Kuhlen et al. | |
| 4,745,293 | 5/1988 | Christensen | |
| 4,749,254 | 6/1988 | Seaver | |
| 4,836,632 | 6/1989 | Bardorian | |
| 4,839,515 | 6/1989 | Kershaw | |
| 4,870,292 | 9/1989 | Alpert et al. | |
| 4,880,971 | 11/1989 | Danisch | |
| 4,880,982 | 11/1989 | Hoksaas | |
| 4,899,585 | 2/1990 | Kulha | |
| 4,928,006 | 5/1990 | Kershaw | |
| 4,942,306 | 7/1990 | Colbourne | |
| 4,950,885 | 8/1990 | Kershaw | |
| 4,961,069 | 10/1990 | Tsaprazis | |
| 4,979,545 | 12/1990 | Fair | |
| 4,979,797 | 12/1990 | Nemeth | |
| 4,994,682 | 2/1991 | Woodside | |
| 4,998,022 | 3/1991 | Tregay | |
| 5,004,913 | 4/1991 | Kleinerman | |
| 5,038,840 | 8/1991 | Fair | |
| 5,072,617 | 12/1991 | Weiss | |
| 5,088,324 | 2/1992 | Nemeth | |
| 5,164,608 | 11/1992 | Vali et al. | |
| 5,279,338 | 1/1994 | Goossens | |
| 5,362,971 | 11/1994 | McMahon et al. | |
| 5,399,876 | 3/1995 | LaClair | |
| 5,507,326 | 4/1996 | Cadman et al. | 141/198 |
| 5,613,535 | 3/1997 | Loen | 141/226 |
| 5,655,577 | 8/1997 | Loen et al. | 141/198 |
| 5,655,578 | 8/1997 | Farkas | 141/59 |

OTHER PUBLICATIONS

Kinematics and Controls Corporation, "Fiber–Optic Liquid Level Sensors" (brochure). No Date available. Instrumentation and Automation News, Mar. 1995 (one page).

*Primary Examiner*—J. Casimer Jacyna
*Assistant Examiner*—Steven O. Douglas
*Attorney, Agent, or Firm*—Jones, Day, Reavis & Pogue

[57] ABSTRACT

A liquid retention system is disclosed which includes a tank for receiving and retaining a liquid, and including a filling port. A dispenser supplies liquid to the tank through a nozzle which engages the filling port. A pneumatic detection system is provided for fluidly measuring the liquid level state within the tank; i.e., determining whether or not the tank is full. An optical detection system is also provided, which cooperates with the pneumatic detection system, for optically measuring the liquid level state within the tank.

13 Claims, 6 Drawing Sheets

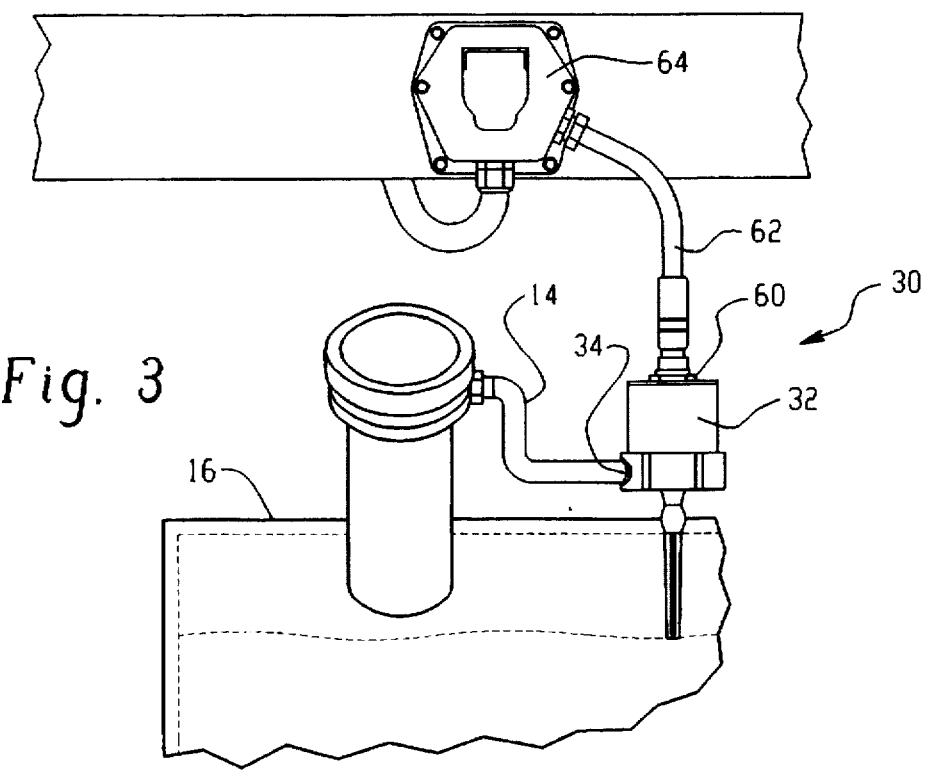
Fig. 3
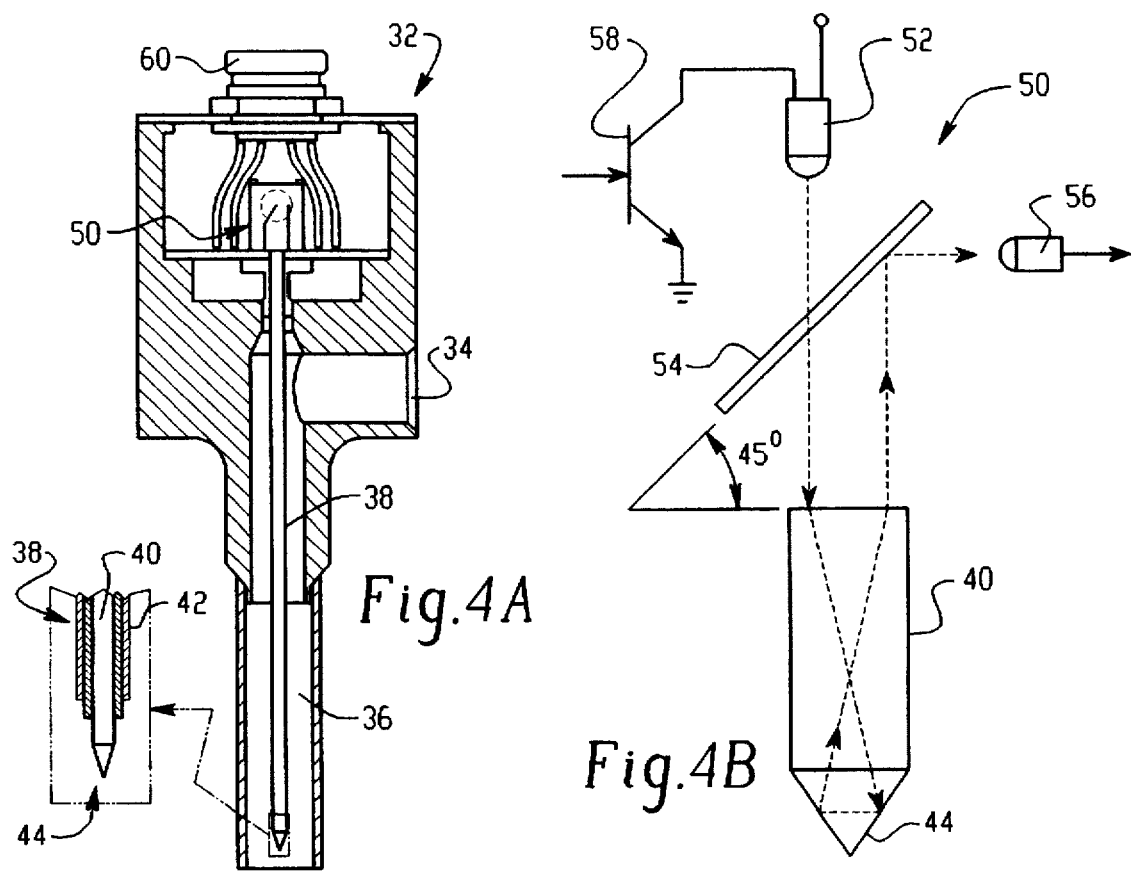
Fig. 4A
Fig. 4B

LIQUID LEVEL DETECTION SYSTEM

BACKGROUND OF THE INVENTION

The present invention is directed to the field of liquid level detection systems, particularly those of the type used to measure the level in a fuel tank; e.g., for a diesel railway locomotive. Fuel tanks in a railway locomotive typically range in volume from 1100–5000 gallons. Fuel volume is typically observed through a sight gauge, which includes a glass window, and is generally hard-mounted to the tank. These windows easily become dirty and hard to read, and are difficult to maintain.

A typical locomotive fuel tank includes two fill openings, one on each respective side of the tank, which receive a fill nozzle. A common type of fill nozzle is the design made by Snyder Equipment Co., Inc. of Nixa, Mo., and is the subject of U.S. Pat. No. 4,441,533 to Snyder et al. This design is of the type that includes a pneumatic liquid level detection system. FIG. 1 shows a previous Snyder-type fill nozzle 10, which fits into a fill opening 12. A vent line 14 is provided to fluidly connect the fill opening 12 to a locomotive fuel tank 16.

When a nozzle lever 18 is opened, diesel fuel flows across an internal venturi 20, which draws down a vacuum. Fuel flowing into the fill opening 12 draws air from the fuel tank 16 through the vent line 14 and into the vacuum. The rising fuel level within the tank 16 eventually covers the bottom tip 22 of the vent line 14, which stops the entry of air into the vacuum at the venturi 20. The vacuum activates an automatic shut-off mechanism 24 which releases the nozzle lever 18 and closes the nozzle, stopping the flow of fuel automatically at the full level.

The previous Snyder System is prone to failure due to air leaks in the system. A principal cause of such leaks is embrittlement and/or detachment of the flexible vent lines 14. In this event, the shut-off mechanism 24 does not operate properly, and filling must be done manually, relying on visual observations of the sight gauges. However, since these gauges are often difficult to read, the operator may not have good information about the fuel level in the tank. This can result in tanks that are under-filled, or over-filled to the point that fuel flows out of the tank, resulting in a personnel hazard and environmental contamination, requiring a costly clean-up operation.

Electronic sensors have been contemplated as a solution to the problem of providing reliable fuel level indication. Such sensor systems typically require alterations to the fuel tank, such as: additional penetrations; welding of flange bosses; or other fixturing with time-consuming preparations such as: draining of the fuel; drilling and chip removal; welding fixtures, and finally, installation and wiring of sensors. These preparatory steps add considerably to the cost of installing electronic sensors. Also, electronic components can pose a potential ignition hazard when used with combustible fuel.

SUMMARY OF THE INVENTION

In view of the difficulties and drawbacks associated with previous level detection systems, it would be advantageous to provide a more reliable system which solves these and many other problems.

Therefore, there is a need for a level detection system which can be installed in an existing tank without modifications.

There is also a need for a level detection system which provides direct liquid level information without interfering with an existing pneumatic level detection system.

There is also a need for a level detection system which automatically discontinues flow when the tank is full.

There is also a need for an electronic level detection system which does not pose an ignition hazard when used for fuel level detection.

These needs and others are realized by the present liquid retention system which includes a tank for receiving and retaining a liquid, and including a filling port. A dispensing means supplies liquid to the tank through a nozzle which engages the filling port. A pneumatic detection system is provided for fluidly measuring the liquid level state within the tank, i.e., determining whether or not the receptacle is full. An optical detection is also provided, which cooperates with the pneumatic detection system, for optically measuring the liquid level state within the tank.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein:

FIG. 3 is a front-sectional view showing a tank with fill opening including a liquid level detection system as according to the present invention.

FIGS. 4A and 4B are respective side-sectional and schematic views detailing the structure and operation of the probe of the liquid level detection system as according to the present invention.

DETAILED DESCRIPTION OF THE INVENTION

Figure 1:
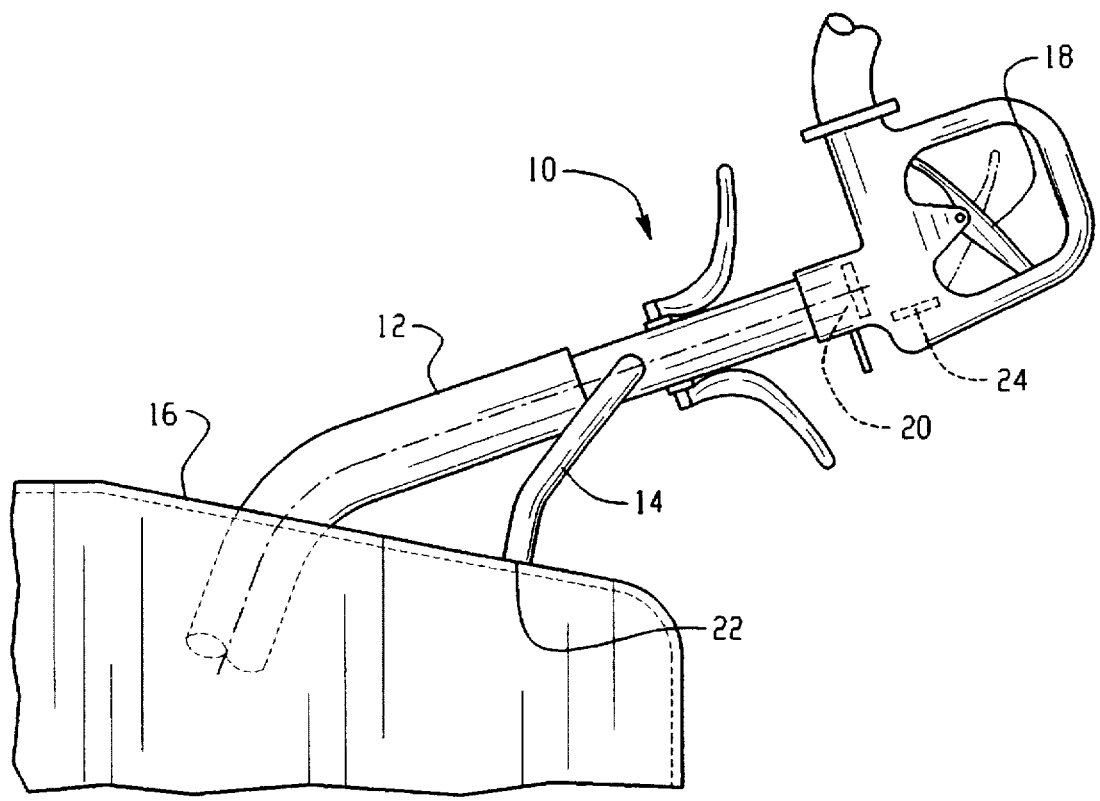
FIG. 1 is a side-sectional view showing a previous liquid filling and retention system.
Figure 2:
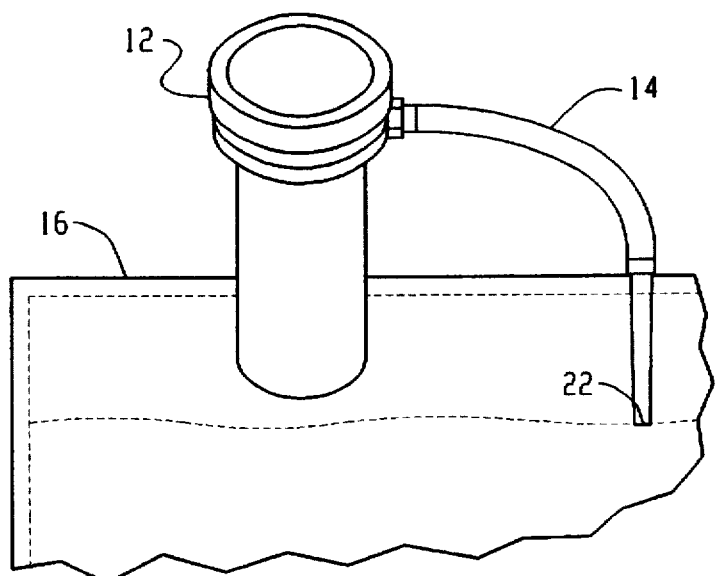
FIG. 2 is a front-sectional view showing a previous tank with fill opening.

FIG. 3 illustrates a tank fitted with a liquid level detection system 30 as according to the present invention. The present liquid level detection system 30 includes a sensor probe 32 which is threaded into the existing vent line fitting. The probe housing includes a port 34 for reattachment of the vent hose 14. The probe 32 includes a fluid passage 36 fluidly connected with the port 34 so as to provide a continuous air passage to the vent line 14. In this way, an existing Snyder-type system can be used concurrently with the present invention. Also, the present invention can be installed without making additional tank penetrations which would require the draining of the tank or other alterations.

As shown in FIG. 3 and in detail in FIG. 4A, the present sensor probe 32 is an optical probe which operates according to the principles of light refraction. The probe 32 includes a fiber optic cable assembly 38 which is preferably retained within the fluid passage 36. The cable assembly 38 preferably includes a fiber-optic cable 40 sheathed in a thin brass tube 42 with a prism tip 44 at the end of the cable 40.

The operation of the optical probe 32 is shown schematically in FIG. 4B. The probe 32 includes an electronic beamsplitter assembly 50, which cooperates with the cable assembly 38 to detect a full liquid level. A light source, e.g., a photo-emitter 52, preferably a light-emitting diode or LED, emits light which is partially transmitted through a beamsplitter 54, which is preferably a partially reflective mirror set at a 45 degree angle to the light path. The transmitted light is coupled to the fiber-optic cable 40. The light traverses the length of the cable 40 to the prism 44. If the prism 44 is dry, i.e., if the level of liquid in the tank does not reach the prism, the light is internally reflected 180 degrees through the prism 44 and back into the cable 40. The returning light is reflected by the beamsplitter 54 along a perpendicular light path into a light detector, e.g., a photo-receiver 56, which detects the light and converts it into a "tank not full" output signal that is processed by the electronic components.

If the prism 44 is wet, i.e., if the liquid level in the tank makes contact with the prism 44, the higher index of refraction of the liquid destroys the internal reflection within the prism 44, and the light refracts into the liquid. Thus, a negligible light signal is received at the photo-receiver 56, which is interpreted as a "tank full" output signal by the electronic components.

In the preferred embodiment, the signal output of the photo-receiver 56 is conditioned so as to respond to degrees of light attenuation which correspond to different types of liquid, having various indices of refraction. Also, the photo-emitter 52 is preferably configured with a switching device, e.g., a relay or a transistor 58, which permits the light source to be switched on and off by an input signal.

The present optical system is especially well suited for fuel level detection, since the energy requirements for electro-optical components are so small as to substantially preclude the initiation of fuel combustion. In this way, the present system provides greater safety than previous systems.

The probe 32 includes an electrical connector 60 which is attached to a conductor cable 62. The connector 60 is preferably liquid-tight, having an IP68 rating able to withstand 2 meters of immersion. The conductor cable 62 is attached to a receptacle 64 (preferably of SAE J560d type) for receiving the fuel service instrument (described in detail below). The receptacle 64 includes electrical contacts and a spring-loaded cover to keep out contamination when the fuel service instrument is not installed.

A microprocessor, under the direction of proprietary software, controls the input signal to the probe 32 and monitors the return output signal. Since the operational power is supplied to the probe 32 from the signal conditioning electronics, the unmodulated output signal is "high" so long as both rails of the operational power circuit are intact and conveying energy. Likewise, the input signal is "high" and the optical path is dry and intact. A loss of input signal, operational power, defective photo-emitter or receiver, or mis-alignment or damage to the optical circuit will cause a loss of output signal to the signal conditioning electronics. In this manner, all operational components—interconnect wiring, power, optical components, etc.—may be checked prior to commencing the fill operation.

To further assure operability of all sensor components, the input signal can be modulated by the signal conditioning electronics as directed by the proprietary software. In the simplest example, the input signal transitions from "high" to "low" causing the switching transistor 58 in series with the LED 52 to turn "off" thus extinguishing the LED 52 and thereby disrupting photon flow through the optical path. The photo-detector 56 reacts to this absence of light and switches the output signal to "low", which is detected by the signal conditioning electronics.

The proprietary software, operating with a "built-in-test" (BIT) algorithm, sets up the condition for transitioning the input signal from "high" to "low", and the expectation of a near simultaneous transition in the output signal from "high" to "low" in response to the transition in the input signal. Once the corresponding "low" signal is detected on the output signal line, the signal conditioning electronics switches the input signal line from "low" to "high" thus turning "on" the switching transistor 58 and, in turn, the LED 52. Photon flow is re-established in the optical circuit thus illuminating the photo-detector 56, causing the output signal to transition from "low" to "high" and the expectation of a near simultaneous transition in the output signal from "low" to "high" in response to the transition in the input signal.

The aforementioned transition of the input signal from "high" to "low"; and verification of the subsequent and anticipated transition of "high" to "low" of the output signal; followed by the inverse transition of the input signal and verification of the subsequent and anticipated transition from "low" to "high" of the output signal constitutes one complete BIT test cycle—effectively simulating the disruption of the photon path in the optical circuit that would occur had the prism become wetted with liquid material. Had the anticipated signal response in the output signal line not occurred, the software would interpret the lack of response as a sensor failure, and such failure would activate a separate signal.

The aforementioned controlled disruption of the optical circuit and subsequent verification technique effectively checks the operability of all electrical elements, wiring, electrical connections, as well as the alignment of optical circuit elements. The principle of operation for the refraction of light through the prism 44 and subsequent losses due to wetting are well understood and governed by the optional laws of nature and therefore intrinsically reliable. The combination of the aforementioned light disruption, detection and verification technique in combination with the physical laws governing the refraction of light through a dry prism and loss of light through a wetted prism provide an effective built-in test technique that can be used to continuously verify operability of the "full" level sensor. Repeated cycles of the test sequence can occur at whatever frequency is appropriate for the intended application. In a simple example, a square wave having a 50-50 duty cycle can be applied to the input signal line and a near simultaneous representation of that same square wave will be repeated on the output signal line so long as the prism is dry. This sequence is a near-continuous verification of sensor operability.

In a filling operation, the liquid level will rise until it contacts the prism. The instant the prism becomes wet, the modulated light is refracted into the liquid thereby attenuating the modulated output signal. The loss of signal occurring immediately following a successful test cycle is interpreted as a "full" condition and initiates a separate signal.

Figure 5C:
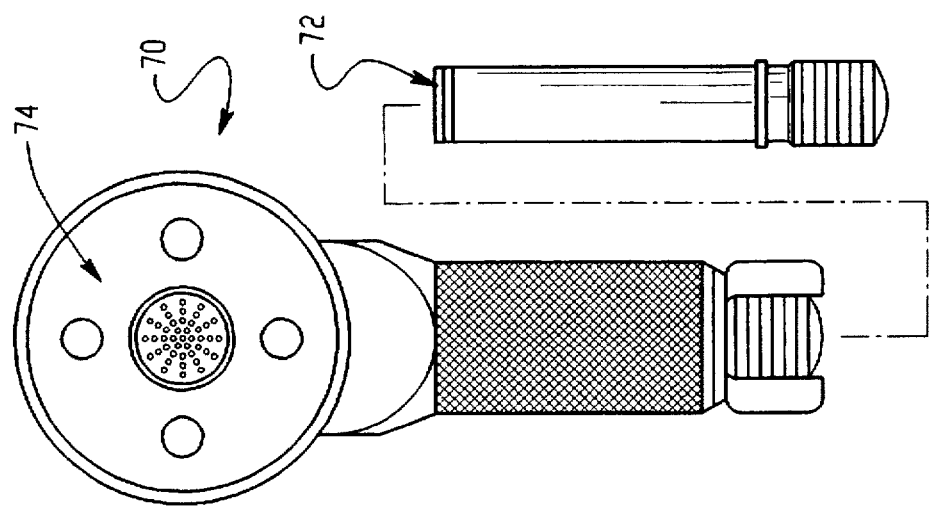
FIGS. 5A, 5B and 5C are respective back, side and front views showing the fuel servicing instrument as according to the present invention.
Figure 5B:
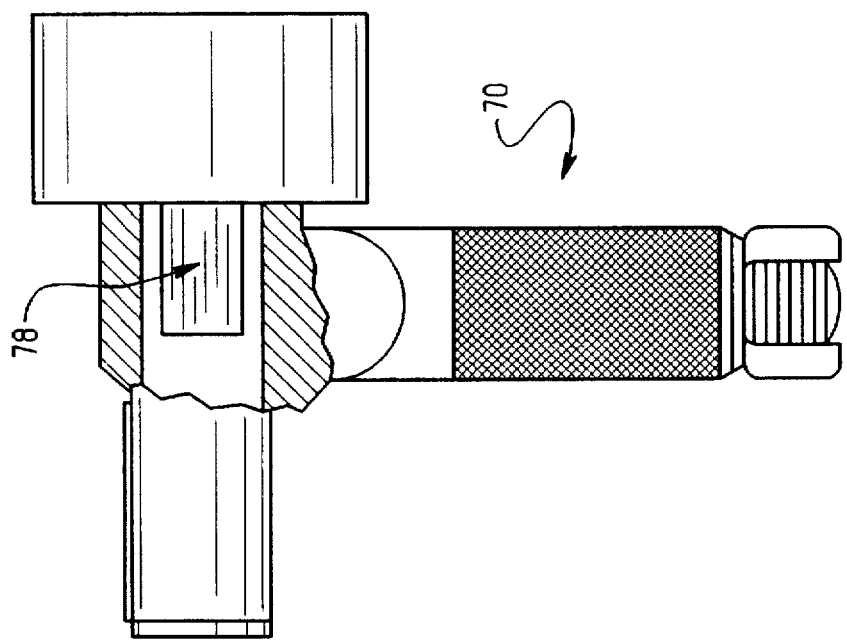
Figure 5A:
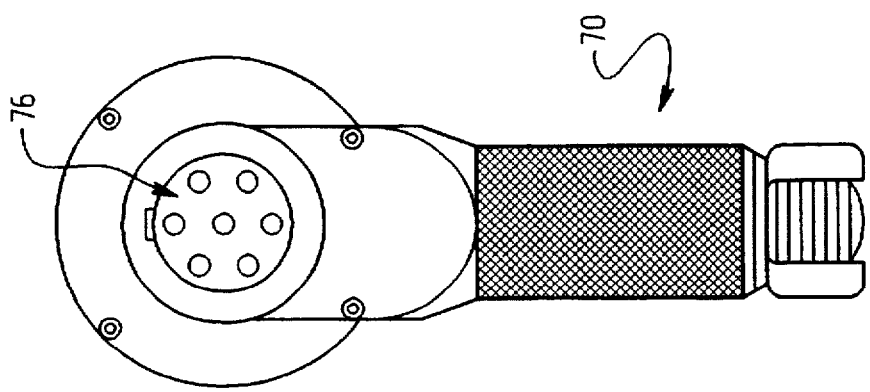

Turning now to FIGS. 5A, 5B and 5C, a signal processor unit in the form of a fuel service instrument (FSI) 70 is disclosed. The FSI 70 is preferably a portable, hand-held instrument which plugs into the receptacle 64 used by a service operator to check the fill status of a tank. The FSI 70 includes the electronic components for processing the output of the probe 32. Also, the FSI 70 includes the power supply for providing electrical power to the tank-mounted components, thus providing further safety for use with combustible liquid.

The FSI 70 includes a rechargeable battery 72, an audio/visual display 74, and a keyed plug end 76 (preferably an SAE J560d plug) for mating with the receptacle 64. An electronics module 78 contains a microprocessor, display drivers and proprietary control software. The elements are retained in a heavy-wall aluminum housing.

Figure 7:
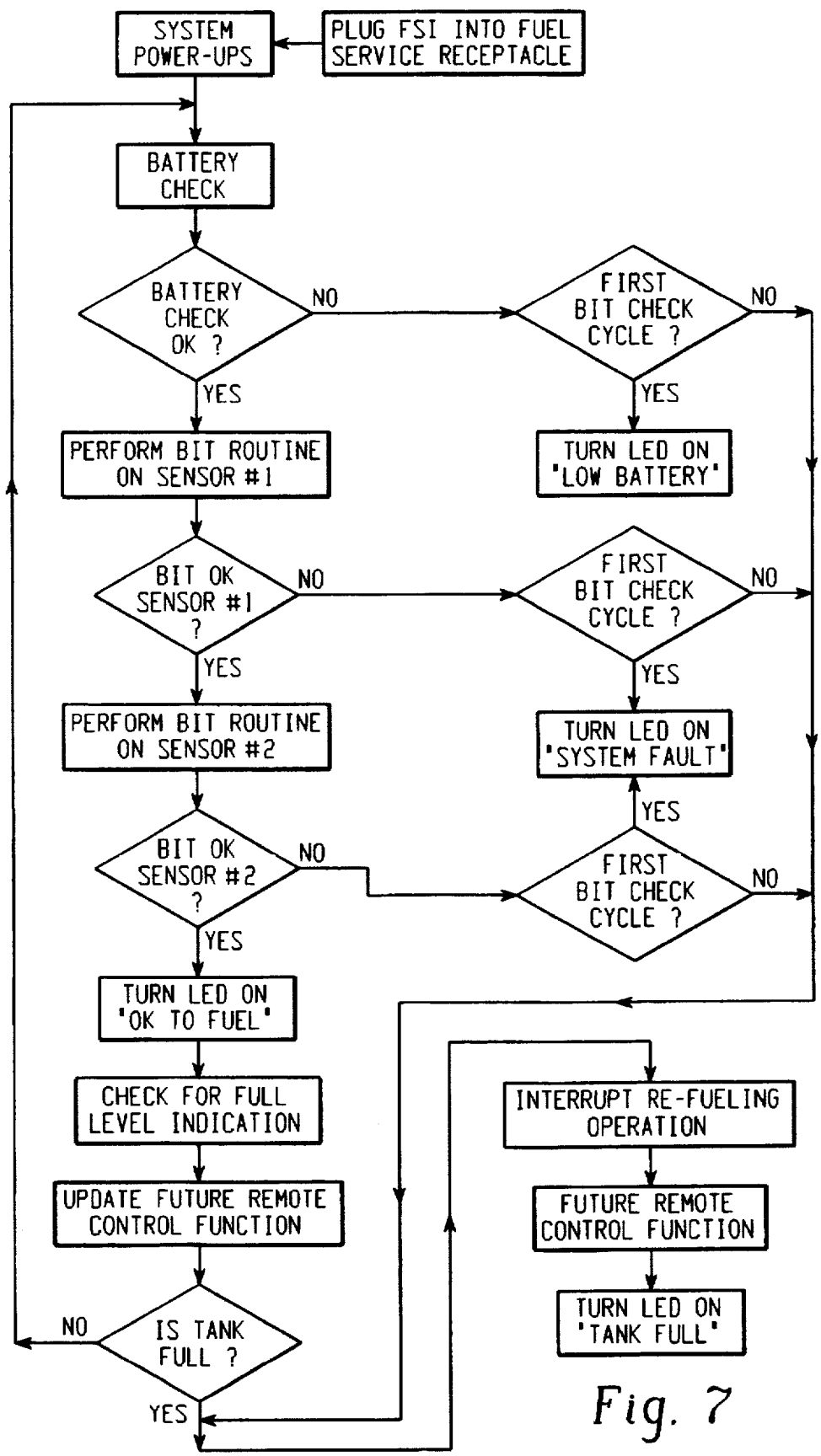
FIG. 7 is a flow chart diagramming the control logic of the present system.

During operation, as also shown in FIG. 7, the fuel service operator plugs the FSI 70 into the receptacle 64 prior to fueling. The control program within the FSI 70 interrogates the probe 32 and associated wiring using the "built-in-test" (BIT) algorithm to verify operability. The control program checks the battery power level. If the battery is low, a "low battery" LED is illuminated on the audio/visual display 74, warning the operator not to commence filling.

If the battery level is adequate, the system passes the BIT on the first test cycle, and an "OK to fuel" LED is illuminated, indicating to the service operator that it is safe to proceed with the filling operation. In the event that the system fails the BIT due to a faulty probe, broken wires, or loose or missing connectors, the "system fault" LED is illuminated, and an audio device sounds an attention signal, indicating to the service operator that it is not safe to proceed with filling until the fault is corrected. As these components are preferably in series, the failure of one component results in the failure of the system, resulting in an essentially "fail-safe" system.

After an "OK to fuel" signal is indicated, the fuel service operator begins the filling operation. The FSI 70 runs the BIT continuously during filling until a "full" level is indicated by the probe 32, at which time the "tank full" LED is illuminated and the audio device sounds an attention signal.

To avoid false activations, the BIT cycle is selected to be about 50 milli-seconds. The pitch and/or duration of the audio device can be programmed to distinguish between the "system fault" and "tank full" conditions. The audio device is preferably a high-intensity piezo element capable of producing an 80 dB level at 4 feet in an open space.

Figure 6:
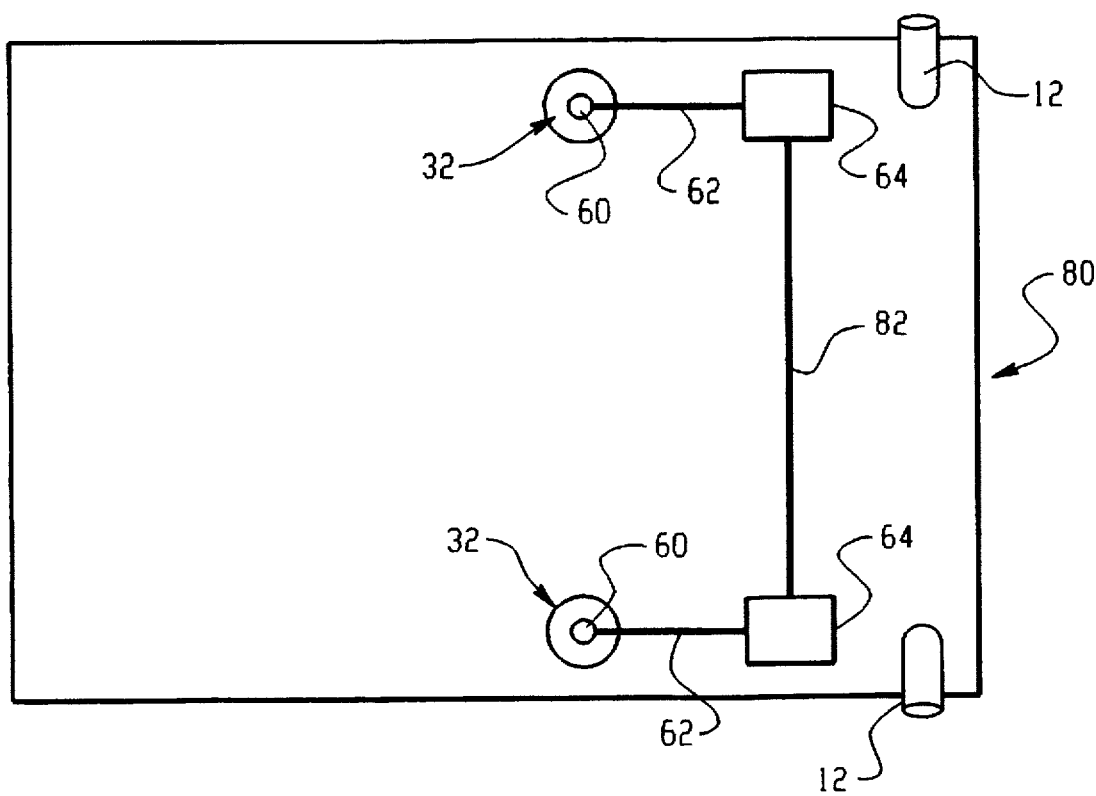
FIG. 6 is a schematic showing the wiring harness as according to the present invention.

Locomotive fuel tanks typically include two fill openings 12, one on each side of the tank, to accommodate various service stations. Consequently, it would be desirable to use a plurality of liquid fuel detection systems 30, at least one for each fill opening 12. A wiring harness 80 is shown in FIG. 6, in which two probes 32 can be connected and operated in tandem, using a single FSI 70, which can be alternately plugged into either respective receptacle 64. The respective receptacles 64 are electrically connected with a conductor cable 82 which permits simultaneous communication of the FSI 70 with both probes 32. The operation of the control program can be adapted to perform the BIT for both probes 32. It is common for an elevational difference of as much as six inches to exist between track rails. Therefore, the system would perform so that whichever of the two probes 32 are first to detect a full liquid level will indicate the "tank full" condition and signal the discontinuation of the filling operation. However, it will be appreciated that only one probe 32 would be required to accommodate both fill openings 12, if filling could be accomplished on level ground.

Figure 8:
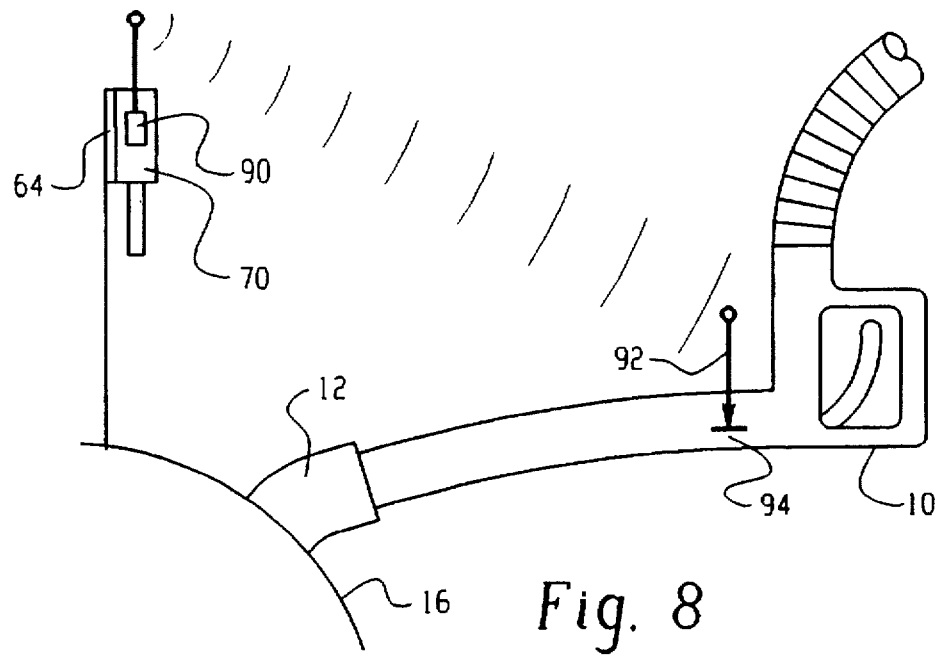
FIG. 8 shows an alternate embodiment of the liquid level detection system as according to the present invention.

In an alternative embodiment of the invention, an alternate signal processor unit can be used to "supervise" the filling operation so as to automatically discontinue flow upon indication of a full liquid level, which would provide greater assurance against the spilling of fuel or other hazardous material. In one aspect of this embodiment, as shown in FIG. 8, the audible alarm can be supplemented by or substituted with a wireless transmitter 90 which sends a signal to a receiver 92 which activates a shut-off mechanism, preferably a relay 94, located in the nozzle 10 or in the pump device within the fuel truck or the refueling depot, so as to automatically discontinue flow upon system fault or attainment of a full level condition. The transmission method could be infrared, RF, microwave or ultrasonic, such as are known. In this way, human error is removed from the filling operation, further reducing risk of a spill.

Figure 9:
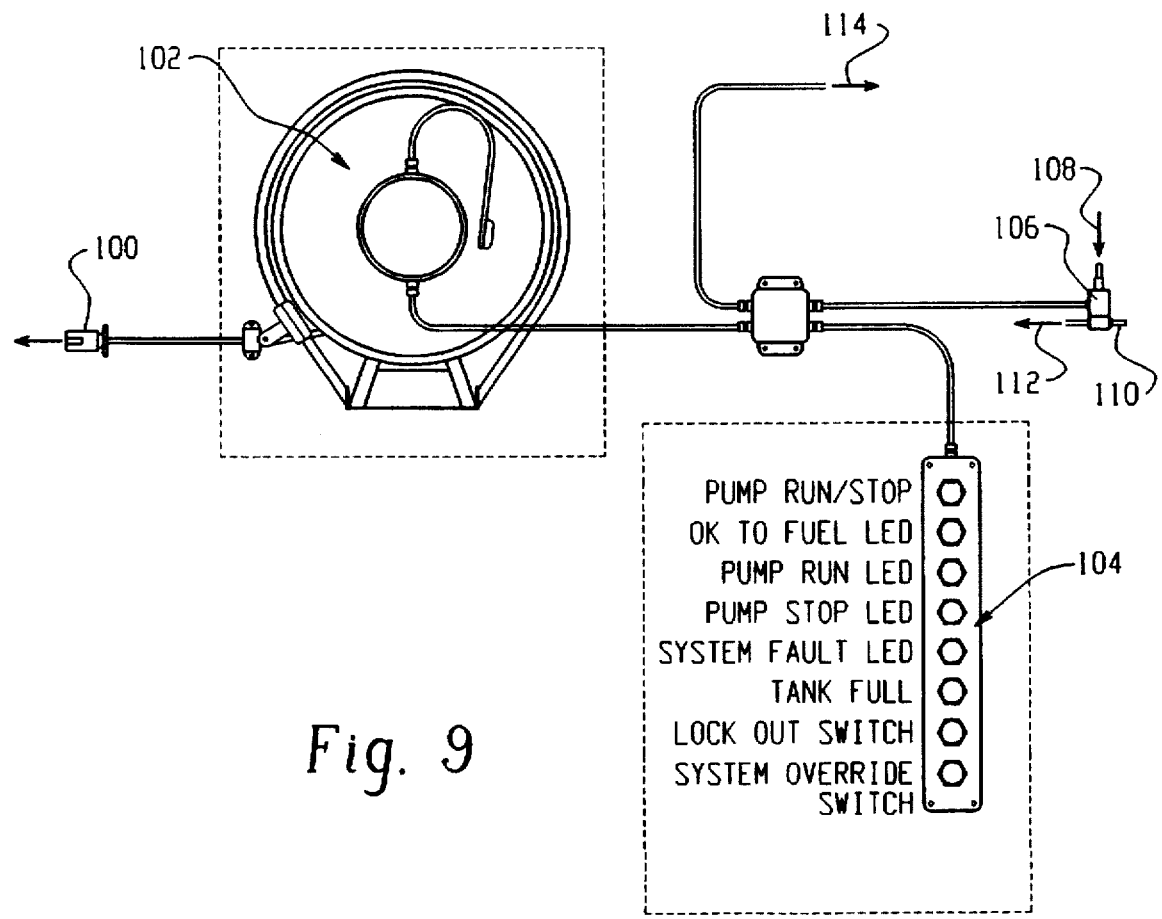
FIG. 9 shows another alternate embodiment of the present liquid level detection system as according to the invention.

In another alternate embodiment of the invention, shown in FIG. 9, an alternate signal processor unit can include a hard-wired connection to the receptacle 64, preferably made via an SAE J560d style plug attached to a cable reel 102, connected to a fuel truck or filling depot. The cable reel 102 can preferably store up to 100 feet of abrasion-resistant communication cable, and includes a "slip-ring" system for making solid electrical connection between the rotating reel parts and the electrical cable. Cable is payed out from the truck or depot to make connection with the receptacle. The cable reel 102 is preferably of the "lift/drag" type in which cable is retracted vertically and pulled horizontally through supports during retraction.

The operation of this embodiment is controlled through a system controller 104 which is located in a remote area such as the cab of the truck or depot. The controller 104 includes power conditioning electronics to filter noise from the truck or depot power supply. The controller 104 includes\components similar in function to the electronics module 78 of the first embodiment, including a microprocessor, display drivers and proprietary control software, for performing the BIT operations.

The operation of this embodiment is substantially identical to the steps shown in FIG. 7, for monitoring the probes 32 and controlling the filling operation. The filling truck or depot is equipped with a pneumatic system interrupt 106, which can be used under an abnormal operating condition, e.g. failure of the Snyder nozzle head, to prevent an imminent overflow condition. Upon indication of a full signal, the solenoid closes, causing the truck's pump to automatically shut off. Thus, the present system offers an improved degree of safety over previous systems.

As described hereinabove, the present invention solves many problems associated with previous systems, and presents improved efficiency and safety. However, it will be appreciated that various changes in the details, materials and arrangements of parts which have been herein described and illustrated in order to explain the nature of the invention may be made by those skilled in the art within the principle and scope of the invention as expressed in the appended claims.

We claim:

1. A liquid retention system comprising:
   a tank for receiving and retaining a liquid; said tank including a filling port;
   a dispersing means for supplying liquid to the tank, said dispersing means including a nozzle which engages said filling port;

a pneumatic detection system, for fluidly measuring a liquid level state within the tank, wherein the liquid level state is selected from the group consisting of full and not-full;

an optical detection system, cooperating with the pneumatic detection system, for optically measuring the liquid level state within the tank, wherein the optical detection system comprises an electro-optic probe further comprising:

a light source;

a light detector;

a prism for receiving light from said light source for alternately directing and not directing said light at the detector to indicate the presence of a desired liquid level state within the tank; and an optical cable for conducting light from the source to the prism and back to the detector, wherein the light traverses the length of the cable and the prism along the same optical path.

2. The liquid retention system of claim 1 wherein the pneumatic detection system cooperates with a vent line, and wherein the optical detection system is formed integrally with the vent line.

3. The liquid retention system of claim 1 wherein the optical detection system generates a signal which is received and processed by a signal processor unit so as to indicate a desired liquid level state within the tank.

4. The liquid retention system of claim 1 wherein the fiber optic cable is retained within the fluid passage and is sheathed in a thin tube with a prism as a tip formed at the end of the cable.

5. The liquid retention system of claim 4 wherein the tube is brass.

6. A liquid retention system comprising:

a tank for receiving and retaining a liquid; said tank including a filling port;

a dispersing means for supplying liquid to the tank, said dispersing means including a nozzle which engages said filling port;

a pneumatic detection system, for fluidly measuring a liquid level state within the tank, wherein the liquid level state is selected from the group consisting of full and not-full;

an optical detection system, cooperating with the pneumatic detection system, for optically measuring the liquid level state within the tank, wherein the optical detection system comprises an electro-optic probe further comprising:

a light source;

a light detector; and a prism for receiving light from said light source and or alternately directing and not directing said light at the detector to indicate the presence of a desired liquid level state within the tank, and wherein the optical detection system further comprises a beamsplitter for transmitting light from the source toward the prism and reflecting light received from the prism toward the light detector.

7. The liquid retention system of claim 6 wherein the beamsplitter is a partially silvered mirror mounted at a 45 degree angle to a light path between the source and the prism, and wherein the detector is retained perpendicular to the light path.

8. A liquid retention system comprising:

a tank for receiving and retaining a liquid; said tank including a filling port;

a dispersing means for supplying liquid to the tank, said dispersing means including a nozzle which engages said filling port;

a pneumatic detection system, for fluidly measuring a liquid level state within the tank, wherein the liquid level state is selected from the group consisting of full and not-full;

an optical detection system, cooperating with the pneumatic detection system, for optically measuring the liquid level state within the tank, wherein the optical detection system generates a signal which is received and processed by a signal processor unit so as to indicate a desired liquid level state within the tank, wherein the optical detection system includes a receptacle for removably engaging the signal processor unit to the optical detection system.

9. The liquid retention system of claim 8 wherein the optical detection system comprises a plurality of probes with a respective plurality of receptacles, and further comprising a wiring harness for electrically connecting said probes and receptacles, wherein the signal processor unit removably engages any of said receptacles so as to measure liquid level from at least one of said probes.

10. The liquid retention system of claim 8 wherein the signal processor unit comprises a hand-held, battery-powered unit which indicates the desired liquid level state within the tank by an audio/visual display.

11. The liquid retention system of claim 8 wherein the signal processor unit comprises means for automatically discontinuing flow upon indication of the desired liquid level state within the tank.

12. The liquid retention system of claim 8 wherein the signal processor unit includes a wireless transmitter and receiver for communicating the signal corresponding to the desired liquid level state.

13. The liquid retention system of claim 8 wherein the signal processor unit includes a detachable hard wire connection for communicating the signal corresponding to the desired liquid level state.

* * * * *